United States Patent
Ponec et al.

(10) Patent No.: US 11,876,254 B2
(45) Date of Patent: Jan. 16, 2024

(54) SYSTEM AND METHOD FOR A SOLID-STATE THERMAL BATTERY

(71) Applicant: Antora Energy, Inc., Fremont, CA (US)

(72) Inventors: Andrew Joseph Ponec, Fremont, CA (US); Justin Briggs, Oakland, CA (US); David Bierman, Oakland, CA (US); Tarun Narayan, Riverside, CA (US)

(73) Assignee: Antora Energy, Inc., Fremont, CA (US)

( * ) Notice: Subject to any disclaimer, the term of this patent is extended or adjusted under 35 U.S.C. 154(b) by 243 days.

(21) Appl. No.: 17/095,499

(22) Filed: Nov. 11, 2020

(65) Prior Publication Data

US 2021/0143446 A1    May 13, 2021

Related U.S. Application Data

(60) Provisional application No. 62/934,747, filed on Nov. 13, 2019.

(51) Int. Cl.
*H01M 6/38* (2006.01)
*H01M 10/613* (2014.01)
(Continued)

(52) U.S. Cl.
CPC ............ *H01M 6/385* (2013.01); *F24V 30/00* (2018.05); *H01M 10/44* (2013.01);
(Continued)

(58) Field of Classification Search
CPC .... H01M 6/385; H01M 10/44; H01M 10/613; H01M 2220/20; F24V 30/00;
(Continued)

(56) References Cited

U.S. PATENT DOCUMENTS

| 2,142,383 A | 1/1939 | Smith |
| 4,421,661 A | 12/1983 | Claar et al. |

(Continued)

FOREIGN PATENT DOCUMENTS

| CN | 101303207 A | 11/2008 |
| CN | 107314696 A | 11/2017 |

(Continued)

OTHER PUBLICATIONS

Amy, C., et al., "Thermal energy grid storage using multi-junction photovoltaics," Energy Environ.Sci., 2019, 12, 334.

(Continued)

*Primary Examiner* — Stacy Whitmore

(74) *Attorney, Agent, or Firm* — Fredrikson & Byron, P.A.

(57) ABSTRACT

A solid-state thermal battery system is disclosed herein. The system includes a stationary thermal storage medium that can be charged by adding heat to the thermal storage medium. Actuated heat engines can be utilized to discharge the solid-state thermal battery, converting the heat stored in the thermal storage medium into electricity. The heat engines are actuated in a manner that reduces thermal gradients in the thermal storage medium to increase the efficiency of the system. In one embodiment, the thermal storage medium is contained in a main chamber of an insulated container. The heat engines are stored, when idle, in an ancillary chamber adjacent to the main chamber and moved into the main chamber by an actuation system to begin discharging the solid-state thermal battery. The heat engines follow a path during discharge to dynamically move between regions of the thermal storage medium to reduce thermal gradients induced therein.

23 Claims, 11 Drawing Sheets

(51) Int. Cl.
  *H01M 10/44* (2006.01)
  *H02S 40/42* (2014.01)
  *F24V 30/00* (2018.01)

(52) U.S. Cl.
  CPC ........... *H01M 10/613* (2015.04); *H02S 40/42* (2014.12); *H01M 2220/20* (2013.01)

(58) Field of Classification Search
  CPC ......... H02S 40/42; Y02E 10/40; Y02E 10/50; Y02E 60/10; F24S 60/00; F24S 60/10
  See application file for complete search history.

(56) References Cited

U.S. PATENT DOCUMENTS

| | | | |
|---|---|---|---|
| 4,424,800 | A | 1/1984 | Ortega |
| 10,978,720 | B2 * | 4/2021 | Taylor ................. H01M 50/296 |
| 2005/0126172 | A1 | 6/2005 | Hudson et al. |
| 2007/0209365 | A1 | 9/2007 | Hamer et al. |
| 2011/0162829 | A1 * | 7/2011 | Xiang .................... F28C 3/005 165/234 |
| 2011/0296826 | A1 | 12/2011 | Pinto et al. |
| 2014/0127599 | A1 | 5/2014 | Kachi |
| 2018/0108956 | A1 * | 4/2018 | Fortenbacher ...... H01M 10/654 |
| 2019/0219339 | A1 | 7/2019 | Cave |
| 2019/0379061 | A1 * | 12/2019 | Taylor ................. H01M 50/289 |
| 2021/0010758 | A1 | 1/2021 | Chopard et al. |
| 2021/0143446 | A1 | 5/2021 | Ponec et al. |
| 2022/0170388 | A1 | 6/2022 | O'Donnell et al. |

FOREIGN PATENT DOCUMENTS

| | | | | |
|---|---|---|---|---|
| DE | 102010028726 | A1 | 11/2011 | |
| FR | 2811744 | A1 | 1/2002 | |
| GB | 2516453 | A * | 1/2015 | ............... F01K 3/12 |
| KR | 100709857 | B1 | 4/2007 | |
| WO | 9114906 | A1 | 10/1991 | |
| WO | WO-2016050368 | A1 * | 4/2016 | ............... F01K 3/00 |
| WO | 2020254001 | A1 | 12/2020 | |

OTHER PUBLICATIONS

Datas, A., et al., "Amadeus: Next generation materials and solid state devices for ultra high temperature energy storage and conversion," AIP Conference Proceedings 2033, 170004 (2018); https://doi.org/10.1063/1.5067168; published online: Nov. 8, 2018.

Datas, A., et al., "Ultra high temperature latent heat energy storage and thermophotovoltaic energy conversion," Energy 107 (2016) 542-549, Elsevier.

* cited by examiner

SYSTEM AND METHOD FOR A SOLID-STATE THERMAL BATTERY

CROSS-REFERENCE TO RELATED APPLICATIONS

This application claims the benefit of prior filed U.S. Provisional Application No. 62/934,747, filed on Nov. 13, 2019, which is hereby incorporated by reference in its entirety.

TECHNICAL FIELD

The present disclosure relates to the field of large capacity energy storage. More specifically, the embodiments set forth below describe a system and method for a solid-state thermal battery.

BACKGROUND

The transition to renewable energy, such as wind and solar energy, is giving rise to an increased demand for large-scale energy storage solutions that can be deployed in the grid. There is a growing demand for energy storage solutions for capturing excess energy when energy production outpaces energy demand and for supplying energy when energy demand exceeds energy production. Existing battery technologies are improving, but have limits such as: material sourcing challenges, high cost, and performance limitations. An affordable and scalable solution to address the technical requirements does not exist in the current market.

Thermal energy storage is one type of energy storage that has faced two significant challenges. Thermal energy storage refers to a manner of storing excess energy as heat in some type of storage medium. Conventional thermal energy storage systems pump a molten storage medium through a network of pipes and heat exchangers to bring heat to a heat engine. The transport of a molten material is faced with numerous problems and risks. Furthermore, existing thermal energy storage approaches generally make use of turbine-based heat engines (e.g., steam turbines), which have inadequate efficiency rates, costs, scalability, operations and maintenance requirements, etc., for practical use. Research into solid storage mediums has faced other challenges. If heat is extracted from the surface of a storage medium faster than the heat can flow through the volume of the storage medium, a large thermal gradient can develop, which can leave large portions of the storage medium undischarged and creating the potential for a thermal-shock induced mechanical failure. Thus, there is a need for addressing these issues and/or other issues associated with the prior art.

SUMMARY

A system and method are disclosed for charging and discharging a solid-state thermal battery. The system utilizes actuated heat engines to control a location relative to a thermal storage medium associated with the conversion of heat into electrical energy. By varying the location over time, high power and high energy capacity of the system can be achieved while mitigating risks associated with mechanical shock due to high thermal gradients.

In a first aspect of the present disclosure, a system for storing energy in a solid-state thermal battery includes an insulated container, a thermal storage medium enclosed within the insulated container, and one or more actuated heat engines proximate the thermal storage medium.

In some embodiments, the thermal storage medium comprises an array of blocks arranged in a pattern such that one or more passageways are defined in the negative space between the blocks. In an embodiment, the solid-state thermal battery is discharged by moving, via an actuation system, at least one of the one or more actuated heat engines through the one or more passageways.

In some embodiments, the one or more actuated heat engines are stored in an ancillary chamber of the insulated container when not actively converting heat stored in the thermal storage medium into electricity. In an embodiment, the ancillary chamber is located adjacent to and separated from a main chamber by an insulated wall. The thermal storage medium is disposed in the main chamber, and the insulated wall includes one or more openings configured to allow the one or more actuated heat engines to be moved from the ancillary chamber into the main chamber. In an embodiment, at least one opening in the one or more openings comprises a non-direct passageway that prohibits a direct line of sight from the main chamber into the ancillary chamber.

In some embodiments, the array of blocks comprises a one-dimensional array of rectangular prisms. In other embodiments, the array of blocks comprises a number of concentric rings surrounding a central circular column. In yet other embodiments, the array of blocks comprises a regular or irregular arrangement of columns.

In some embodiments, the solid-state thermal battery is discharged by actuating, via an actuation system, a plurality of insulated doors disposed in an opening between a main chamber and an ancillary chamber of the insulated container. Each insulated door is disposed between the thermal storage medium and an actuated heat engine stored in the ancillary chamber. A control system is configured to activate different subsets of insulated doors at different times to vary a region of discharge of the thermal storage medium over time.

In some embodiments, the system further includes a control system configured to operate the one or more actuated heat engines to dynamically discharge different regions of the thermal storage medium over a period of time in order to reduce a thermal gradient in each region of the thermal storage medium and a cooling system configured to regulate an operating temperature of the one or more actuated heat engines.

In some embodiments, the system further includes an atmospheric control system, a cleaning system, and a gas reservoir system.

In some embodiment, at least one actuated heat engine in the one or more actuated heat engines comprises one or more thermophotovoltaic (TPV) cells.

In some embodiments, the one or more actuated heat engines include at least two different types of actuated heat engines, and a particular type of actuated heat engine is selected by the control system in accordance with a desired or current operating condition of the system.

In some embodiments, the thermal storage medium is charged by direct resistive heating by applying an electrical current to electrodes attached to the thermal storage medium. In an embodiment, the electrical current is applied using an alternating current (AC) power source. In other embodiments, the thermal storage medium is charged by indirect radiant heating.

In a second aspect of the present disclosure, a method is disclosed for storing energy in a solid-state thermal battery. The method includes the steps of charging a thermal storage medium by heating one or more blocks to increase a temperature of the one or more blocks and discharging the thermal storage medium to convert heat into electricity by controlling one or more actuated heat engines in proximity to the thermal storage medium.

In some embodiments, controlling the one or more actuated heat engines in proximity to the thermal storage medium comprises moving, via an actuation system, at least one actuated heat engine from an ancillary chamber of an insulated container into a main chamber of the insulated container. The thermal storage medium is contained in the main chamber and defines at least one passageway for the at least one actuated heat engine to move along a path within the main chamber.

In some embodiments, a control system is configured to vary a position of the at least one actuated heat engine along the path over time to reduce a thermal gradient in each of several regions within the thermal storage medium.

In some embodiments, controlling the one or more actuated heat engines in proximity to the thermal storage medium includes operating a plurality of insulated doors disposed between a main chamber of an insulated container and an ancillary chamber of the insulated container. Different subsets of insulated doors are open at different times to reduce a thermal gradient in each of several regions within the thermal storage medium.

DETAILED DESCRIPTION

The following description of the embodiments of this disclosure are not intended to limit the scope of this disclosure to these particular embodiments, and different and further implementations are capable of being implemented by one of skill in the art.

The systems and methods described herein disclose a solid-state thermal battery that includes a stationary thermal storage medium that can be charged by adding heat to the thermal storage medium. Actuated heat engines can be utilized to discharge the solid-state thermal battery, converting the heat stored in the thermal storage medium into electricity. The heat engines are actuated in a manner that reduces thermal gradients in the thermal storage medium to increase the efficiency of the system.

In some embodiments, the thermal storage medium is preferably a solid or solid/liquid phase change thermal storage medium that is heated or "charged" in place within an insulated environment (e.g., container, room, building, etc.). The use of stationary solid-state thermal storage medium can enable the use of readily available materials. Energy can be stored as high-grade, sensible heat with high-density in plentiful (i.e., earth-abundant) materials functioning as the thermal storage medium. In some embodiments, the system can yield affordable costs where all-in energy costs may be less than $3/kWh$_t$, for example. Preferably, such an all-solid thermal storage solution can avoid movement and transport of high-temperature or molten material.

In some embodiments, the heat engine is preferably a thermophotovoltaic (TPV) heat engine. In other embodiments, the heat engines can be a thermionic, thermoelectric, and/or other suitable types of heat engines capable of converting thermal energy into electrical energy. In various embodiments, the heat engines can be moved into the storage volume (i.e., in proximity to the thermal storage medium) to transform thermally stored energy into electricity and moved out of the storage volume when idle (i.e., not discharging the solid-state thermal battery). The path of motion of the heat engine(s) can be designed to reduce the thermal gradient in the thermal storage medium by varying the location of the heat engine proximate the thermal storage medium over time.

In other embodiments, actuators can move insulating features located between the thermal storage medium and the heat engine to enable or disable discharge of the solid-state thermal battery. In such embodiments, both the thermal storage medium and the heat engines can be stationary, but the insulating features block significant amounts of heat from reaching the heat engines when in a first position and allow the heat to reach the heat engines when in a second position. By actuating different insulating features corresponding to multiple heat engines at different times, the solid-state thermal battery can be discharged in an efficient manner that reduces thermal gradients across the thermal storage medium.

Figure 1:
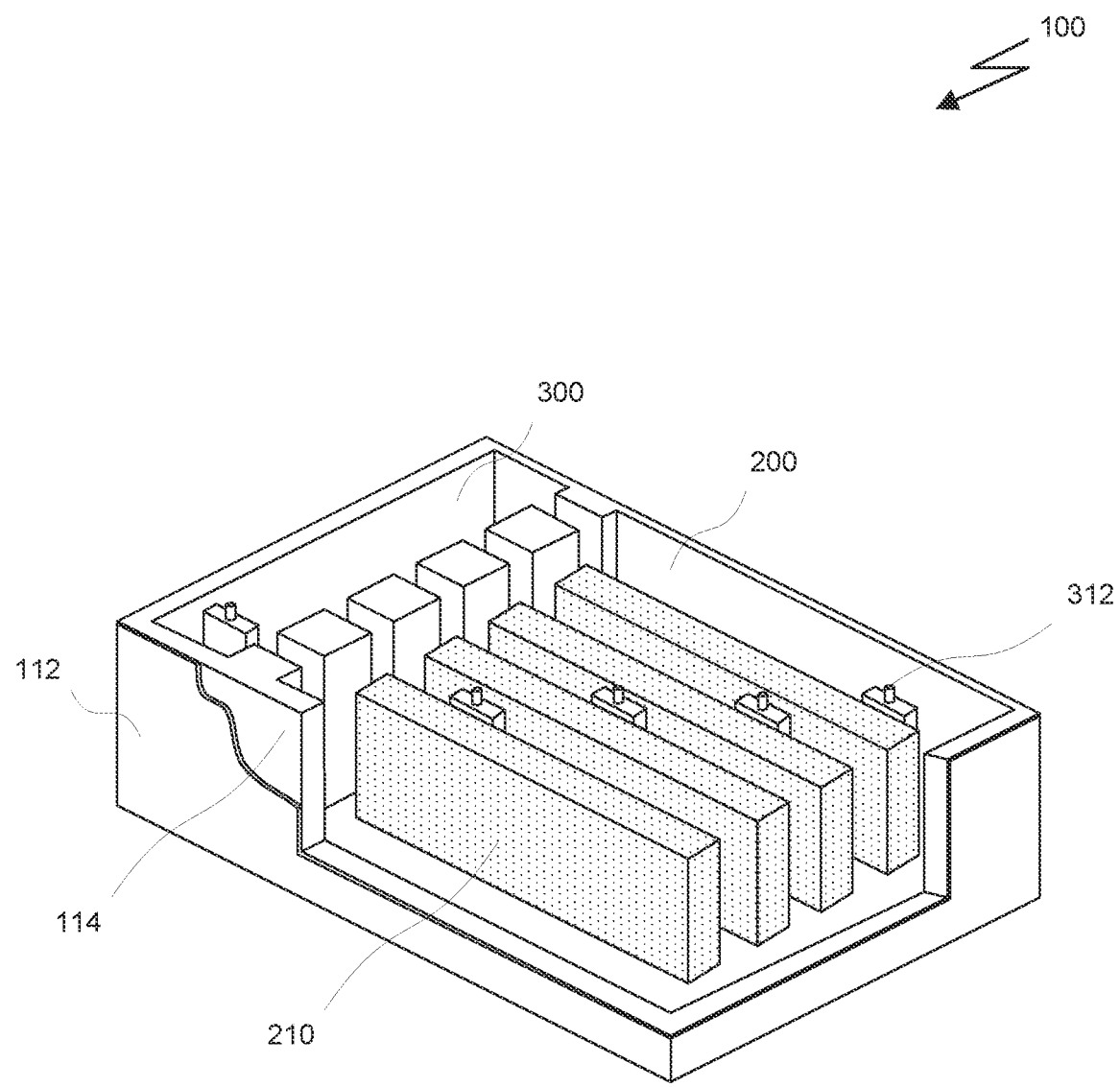
FIG. 1 illustrates a system for storing energy in a solid-state thermal battery, in accordance with some embodiments.

FIG. 1 illustrates a system 100 for storing energy in a solid-state thermal battery, in accordance with some embodiments. The system includes at least one thermal storage medium 210. In an embodiment, the thermal storage medium 210 is implemented as an array of blocks arranged in a pattern. In an embodiment, the blocks can be solid and formed from graphite, carbide, or carbon-based material, although the blocks can be formed from other types of non-carbon based materials. The pattern is arranged to provide a defined path of travel for actuated heat engines 312. In an embodiment, the heat engines 312 are TPV heat engines and are attached to an overhead gantry. The gantry system is designed to move the heat engines 312 relative to the stationary thermal storage medium 210. In other embodiments, the heat engines 312 can be implemented as other types of devices that are capable of converting heat into electricity including, but not limited to, thermoelectric, thermionic, or some combination thereof.

To charge the solid-state thermal battery, in some embodiments, electricity from an external source (e.g., the electrical grid or another power source such as a gas turbine) is passed through the blocks. The electricity resistively heats the blocks to temperatures in the range of, e.g., 1000 degrees Celsius (0% state of charge, SoC) to 2500 degrees Celsius (100% SoC), though other suitable ranges can be achieved depending on the choice of thermal storage medium 210 and other system elements. In other embodiments, charging can be performed using other methods such as heating through radiant heat from a heating element, laser heating, RF heating, microwave heating, and other non-contact methods. In some embodiments, the thermal storage medium 210 can be charged by indirectly heating the blocks. For example, electricity from the external source can be passed through a graphite (or other type) resistive heating element that produces radiant heat proximate the blocks to charge the blocks. In other embodiments, heating can be implemented through non-electrical sources in addition to or in lieu of electrical sources. Examples of non-electrical sources include high temperature waste heat from industrial facilities, combustion heat, or solar radiation. It will be appreciated that any technique for heating the thermal storage medium 210, including combinations of two or more heating techniques, can be utilized to charge the solid-state thermal battery.

In some embodiments, the thermal storage medium 210 is preferably stored in an insulated container or vessel to minimize heat leakage, and the environment of the container can be controlled. In one embodiment, the container is formed as a steel shell 112 surrounding an insulating layer 114. The insulating layer 114 can be, e.g., a ceramic material. In some embodiments, a reflective material can be applied to the interior surface of the container to make the container more efficient. The container can take the form of a box (e.g., welded steel box, converted standard shipping container, etc.) or a building, depending on the size of the system. In one embodiment, the environment of the container is conditioned to include an inert atmosphere (e.g., Argon, Nitrogen, Krypton, etc.) to prevent oxidation (or other consequence) of the thermal storage medium. Other types of atmosphere are contemplated as being within the scope of the present disclosure.

In some embodiments, the TPV heat engines 312 are stored in a portion of the container that is, at least partially, isolated from the area housing the thermal storage medium 210. The main chamber 200 housing the thermal storage medium 210 can be referred to as a thermal chamber, and the ancillary chamber 300 storing idle heat engines 312 can be referred to as an isolation chamber, idle bay, storage locker, or the like. For example, a wall may be erected to separate the main chamber 200 from the ancillary chamber 300, which can be kept at a lower temperature than the ambient temperature of the main chamber 200. The wall can include slots or doors to allow the heat engines 312 to be moved into the main chamber 200.

The solid-state thermal battery can be discharged using one or more actuated heat engines 312. In an embodiment, one or more heat engines 312 are moved from the ancillary chamber 300 to the main chamber 200 using, e.g., an overhead gantry. The heat engines are then moved through a number of slots between the blocks that define the path of travel of the heat engines 312. The heat engines 312 convert heat (from convection, radiation, etc.) into electricity that is output from the system. The electrical output can be fed back into the electrical grid or supplied to any other system or load (e.g., a building, etc.).

In an embodiment, the heat engines 312 are cooled to a temperature of less than 150 degrees Celsius to maintain efficient operation (e.g., air-cooled, liquid-cooled, or other suitable cooling solutions). It will be appreciated that the limit of 150 degrees Celsius is one exemplary temperature limit; however, in other embodiments, the temperature limit can be higher (e.g., 400 degrees Celsius) based on the structure and materials (or other design characteristics) of the heat engines 312. In a liquid-cooled embodiment, the coolant can be pumped to the TPV heat engines through the gantry structure, and the heated coolant can be fed out to a radiator or other heat exchanger. In some embodiments, the heated fluid used to cool the heat engines 312 can be used to generate steam and directed to a steam turbine so that at least a portion of the heat drawn off the heat engines 312 can be converted back into electricity by a generator coupled to the steam turbine. The electricity generated by the generator can be combined with the electricity produced by the heat engines 312 in the electrical output or fed back into the thermal storage medium to re-heat the blocks. Additionally, the heat from the coolant could be used in other ways, e.g., to supply heat to an industrial process or to provide heating (e.g., radiant heat) for a facility or district. In other embodiments, cooling may not be needed. For example, given a sufficient number of heat engines 312 in the ancillary chamber 300, the heat engines 312 can be moved into and out of the main chamber 200 in a revolving manner such that the time that a given heat engine 312 is generating electricity is not sufficient to increase the temperature of the heat engine 312 above a maximum operating temperature. Prior to reaching the maximum operating temperature, the heat engine 312 can be returned to the ancillary chamber 300 to cool down, where the ancillary chamber 300 is maintained at a temperature of less than, e.g., 100 degrees Celsius. A different heat engine 312 is moved into the main chamber 200 to make electricity while the other heat engine 312 cools down. In yet other embodiments, the heat engine 312 can be cooled using other suitable cooling systems (e.g., forced air and heat sinks) or maintained in a different operating temperature range.

The system is preferably used to provide an energy storage solution that can be used in a variety of applications. Implementations of the system can be scaled to a wide variety of energy storage capacities. In an exemplary use case, the system is scaled to be applicable in electrical grid-scale energy storage. Alternatively, the system can be scaled for other types of scenarios such as personal power backups for a house or building. The system could alternatively be integrated into other systems where conventional energy production techniques are used in combination with the solid-state thermal battery.

The disclosed system can offer potential benefits over prior art systems. For example, as one potential benefit, the system can provide a thermal energy storage solution that is efficient while simultaneously avoiding movement of high-temperature material (e.g., molten material). This can contribute to a more reliable and efficient system that is easier to maintain over time. As another potential benefit, the system can use thermal storage mediums that are affordable, abundantly available, and easily handled. For example, the material for manufacturing carbon blocks has various uses and is widely available.

As another potential benefit, the system is not limited to a small number of usage cycles and has the potential for reliable long-term use for a number of years, potentially exceeding tens or hundreds of years of operation. As yet another potential benefit, the system described herein is modular and repeatable, which allows for easily scaling the system to meet changes in energy storage capacity needs. Further, the physical size and scale of the system can be modified for a variety of different use cases. Similar units or cells of the system can be operated in parallel with other units with little impact of performance. The system can be a cost-effective and economical solution for various energy needs.

As one potential benefit, the system can utilize TPV heat engines that are efficient at the operating conditions within the system through the reflectance of low-energy (i.e., sub-bandgap) photons to recycle this energy within the system, as will be discussed in more detail below. As another potential benefit, a method of operating the system can reduce mechanical risk imposed by thermal conductivity limitations. For example, the manner of operation can reduce the thermal gradient within the thermal storage medium, which can create, when heat is extracted from the surface faster than heat can flow through the material, the potential for thermal-shock-induced mechanical failures as well as inefficient operation of the heat engines.

In one embodiment, a manner of operating the system is disclosed that causes the heat engine 312 to move past the thermal storage medium 210 during discharge to effectively limit the average discharge rate for any one region of the surface of the thermal storage medium 210 while keeping the aggregate discharge rate of the system high. This approach, enabled by lightweight and modular heat engines, can alleviate the constraints imposed by a thermal conductivity characteristics of the thermal storage medium 210 and can effectively de-couple the power capacity from the energy capacity of the system.

Figure 2:
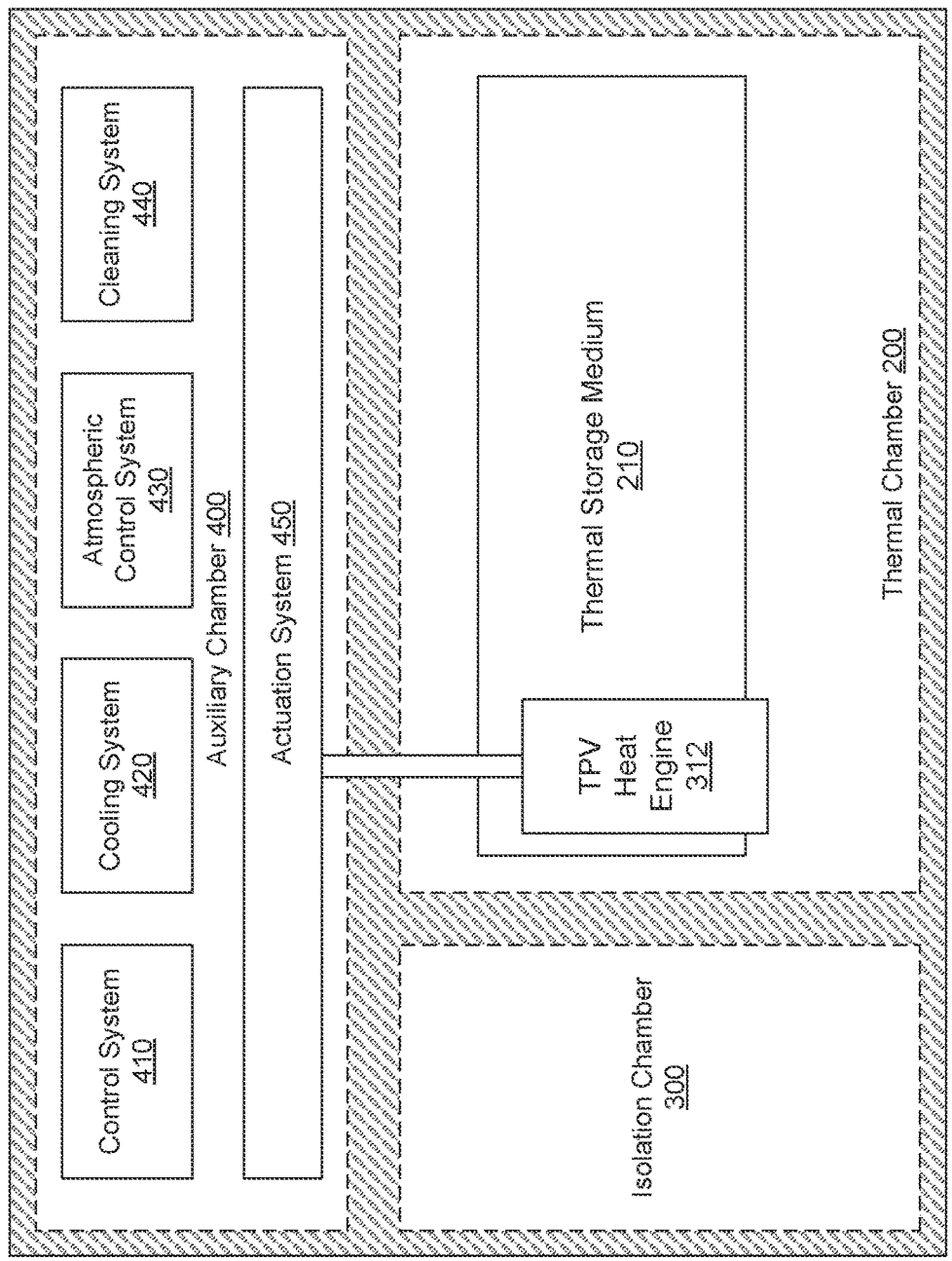
FIG. 2 is a schematic side view of the system of FIG. 1, in accordance with some embodiments.

FIG. 2 is a schematic side view of the system 100 of FIG. 1, in accordance with some embodiments. Again, the system 100 can include a container (e.g., an insulated encasement) that contains the solid-state thermal battery. As shown in FIG. 2, at least one thermal storage medium 210 is stored in a main chamber 200 (i.e., thermal chamber). Heat engines 312 are stored, at idle, in an ancillary chamber 300 (i.e., isolation chamber) and can be moved into the main chamber 200 via an actuation system 450 stored in an auxiliary chamber 400 located above the main chamber 200 and the ancillary chamber 300.

In one embodiment, the heat engines 312 are coupled to an overhead gantry included in the actuation system 450. The gantry is coupled to the heat engine 312 via cable or structural members (e.g., steel tube). The gantry is operable to move the heat engines 312 through the slots in the wall that separate the ancillary chamber 300 from the main chamber 200. In alternative embodiments, the auxiliary chamber 400 can be placed below the main chamber 200, and the actuation system 450 can replace an overhead gantry with conveyors, linear actuators, or the like. In yet other embodiments, the actuation system 450 can be omitted all together and the heat engines 312 can include a self-driving feature such as an electrical drive train that allows the heat engines 312 to move independently through the main chamber 200 under their own power.

In an embodiment, the roof of the main chamber 200 includes slots formed therein that allow passage of the cables or structural members connecting the gantry to the heat engine 312. In some embodiments, the slots can be covered with actuated (e.g., retractable) covers that can be opened when the heat engine 312 moves through the slot and closed when the heat engine 312 is moved back into the ancillary chamber 300. In some embodiments, a number of covers can be actuated in sequence so that the slot is mostly fully covered even when the heat engine is in the main chamber 200, with only one or a small number of covers open at a time to allow passage of the heat engine. It will be appreciated that the covers can be actuated by hydraulic cylinders in the auxiliary chamber 400 or by any other technically feasible means. In some embodiments, the covers may comprise baffles that expand or retract with the motion of the heat engine 312 in the slot. In other embodiments, any other suitable means for restricting heat escaping through the slot is contemplated as being within the scope of the present disclosure.

In one embodiment, the insulated container functions to house and insulate the system 100. It will be appreciated that the insulated container reduces heat leakage from the system in order to enhance the long-term energy storage capabilities of the system. Similarly, even within the insulated container, separation of the ancillary chamber 300 and auxiliary chamber 400 from the main chamber 200 are desirable to improve the long-term operation of the various systems required for operation. By restricting heat to the main chamber 200 as much as possible, the efficiency of the system can be increased as less cooling may be required for the auxiliary systems.

The insulated container can include a number of chambers that house different portions of the system 100. Although three chambers and their arrangement are shown in FIG. 2, other configurations of the system 100 to include a different number or arrangement of chambers are contemplated as being within the scope of the disclosure. In some embodiments, the volume of the container can be between 1 and 10000 cubic meters, although larger or smaller volumes are contemplated as well. The various chambers of the insulated container can include structural members, insulation, conduits for cabling between components, and the like. In a preferred embodiment, the isolated container includes a rigid structural shell 112 (e.g., steel or concrete walls) that surrounds a layer of insulation 114. The insulation layer 114 can include one or more layers of insulating material(s) that are rated for high temperature ranges. At least the innermost layer of insulating material should be operational at temperatures exceeding 1000 degrees Celsius and may be suitable for temperatures up to 3000 degrees Celsius or greater. Some examples of exemplary materials suitable for use as insulation layers can include, but are not limited to: powdered carbon insulation, graphite felt, carbon black, coke powder, carbon powder, structured insulation materials based on charcoal or other carbonized biomass, aluminosilicate wool/fiber, rock wool and/or other suitable materials. Other materials suitable for construction of either the shell 112 or the insulation layer 114 are contemplated as being within the scope of this disclosure.

The insulated container is designed to establish a temperature controlled environment as well as an atmosphere controlled environment. The main chamber 200 functions as a holding room for the heat stored in the thermal storage medium. In one embodiment, in addition to the insulation layer 114 attached to the outer shell, any internal walls that separate the main chamber 200 from any other chamber in the container can include additional insulating layers to further contain the heat in the main chamber 200 and mitigate heat leakage. In one embodiment, the void space in the chambers 200/300/400 can be filled with a slight positive pressure of Argon gas. Alternative atmospheric conditions may be established by an atmospheric control system 430.

It will also be appreciated that the main chamber 200 may include defined openings for access to adjacent chambers, and that the defined openings may include controlled doors, hatches, covers, or the like to open and close to selectively allow access to the main chamber 200, which may also include insulating layers incorporated therein. Alternatively, insulating buffer structures or elements can be used to deflect or mitigate leakage of heat. For example, a defined opening can be exposed through a non-direct passageway such as a serpentine or angled passageway (e.g., L or zigzagged passageway), as shown in the detailed view of FIG. 3. A non-direct passageway can function to block a portion of the thermal emission from the thermal storage system 100.

The auxiliary chamber 400 can also house a control system 410, a cooling system 420, an atmospheric control system 430, and a cleaning system 440. The auxiliary chamber 400 is preferably exposed to lower temperatures than the main chamber 200, providing a more preferable operating environment for various components of the system 100 that may include electronics or other sensitive components. The control system 410 can include electronics or mechanical controls (e.g., gears, shafts, pulleys, etc.) for operating the actuation system 450 to control the position of the heat engines 312 and/or the cooling system 420, atmospheric control system 430, various cleaning system(s) 440, and/or other aspects of the system. In an embodiment, the control system 410 functions to, directly or indirectly, regulate operation of the system, including the charging or discharging of the thermal storage medium 210. The control system 410 can be fully autonomous that operates with no user input or, alternatively, can operate based on partial or full user input supplied from a control panel, device, or other user interface. The cooling system 420 can include components for regulating temperature of the heat engines 312, such as pumps, heat exchangers, and the like. The atmospheric control system 430 can include regulators and valves for controlling the atmosphere (e.g., gas) in the insulated container, including both a mixture of one or more gases as well as the atmospheric pressure within the insulated container. The gas in the insulated container can be treated or a set mixture of a number of additive gaseous components, which can function to augment performance by preventing oxidation or buildup of contaminants on the components of the system.

Figure 6:
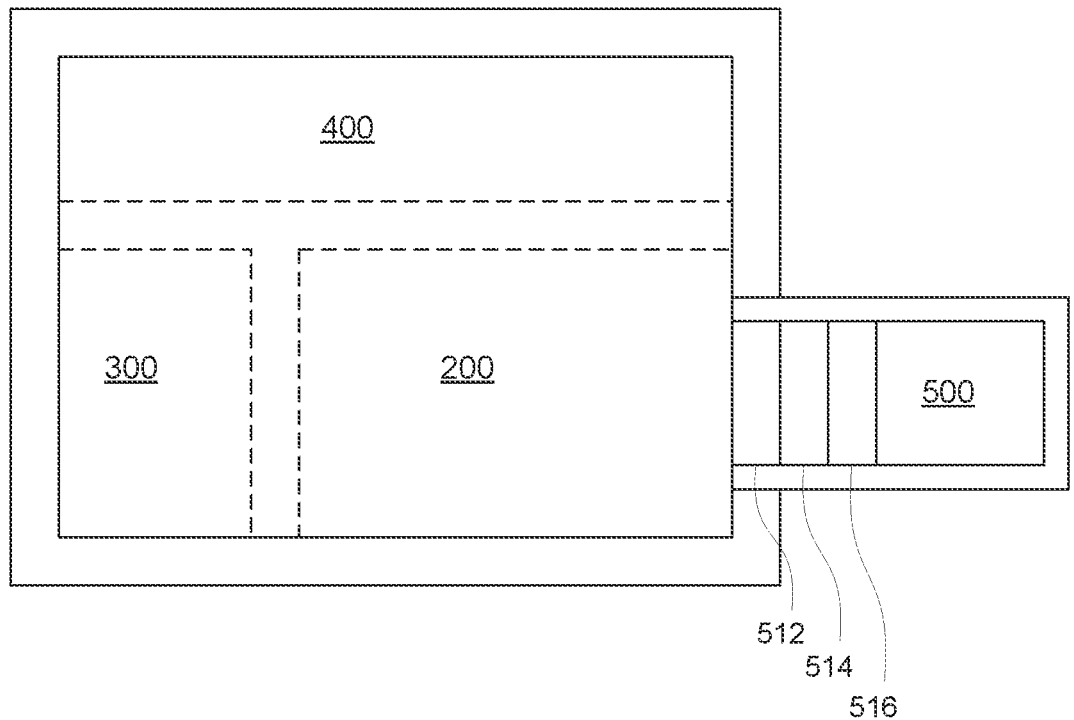
FIG. 6 is a schematic representation of a system that includes an atmospheric control system, in accordance with some embodiments.

In one embodiment, the atmospheric control system 430 includes a gas reservoir system 500, a filter system 512, a regenerator system 514, and an atmospheric treatment system 516, as depicted in FIG. 6. The gas reservoir system 500 can act as a temporary storage container for gas removed from the main chamber 200 as a way to relieve pressure of the system. It can be appreciated that simply venting the gas from the insulated container would allow heat leakage which could decrease the efficiency of the system. The gas reservoir system 500 is preferably insulated so that gas removed from the main chamber 200 can be kept at a high temperature such that it can be added back to the active region of the system without inducing cooling of the thermal storage medium 200.

In one embodiment, the atmospheric control system 430 can include a separate outlet (e.g., vent) so that gas can be expelled. The regenerator system 514 can remove heat from gas leaving the main chamber 200 and entering the reservoir system 500, and add heat to the gas leaving the reservoir system 500 and entering the main chamber 200. In some embodiments the gas reservoir system 500 can include a dynamic volume via a movable wall or piston, using an elastic container, or using some other type of variable sized containment system. In one embodiment, the gas treatment system 516 or related subsystem can include a pump to store excess gas in a pressurized state.

Figure 3:
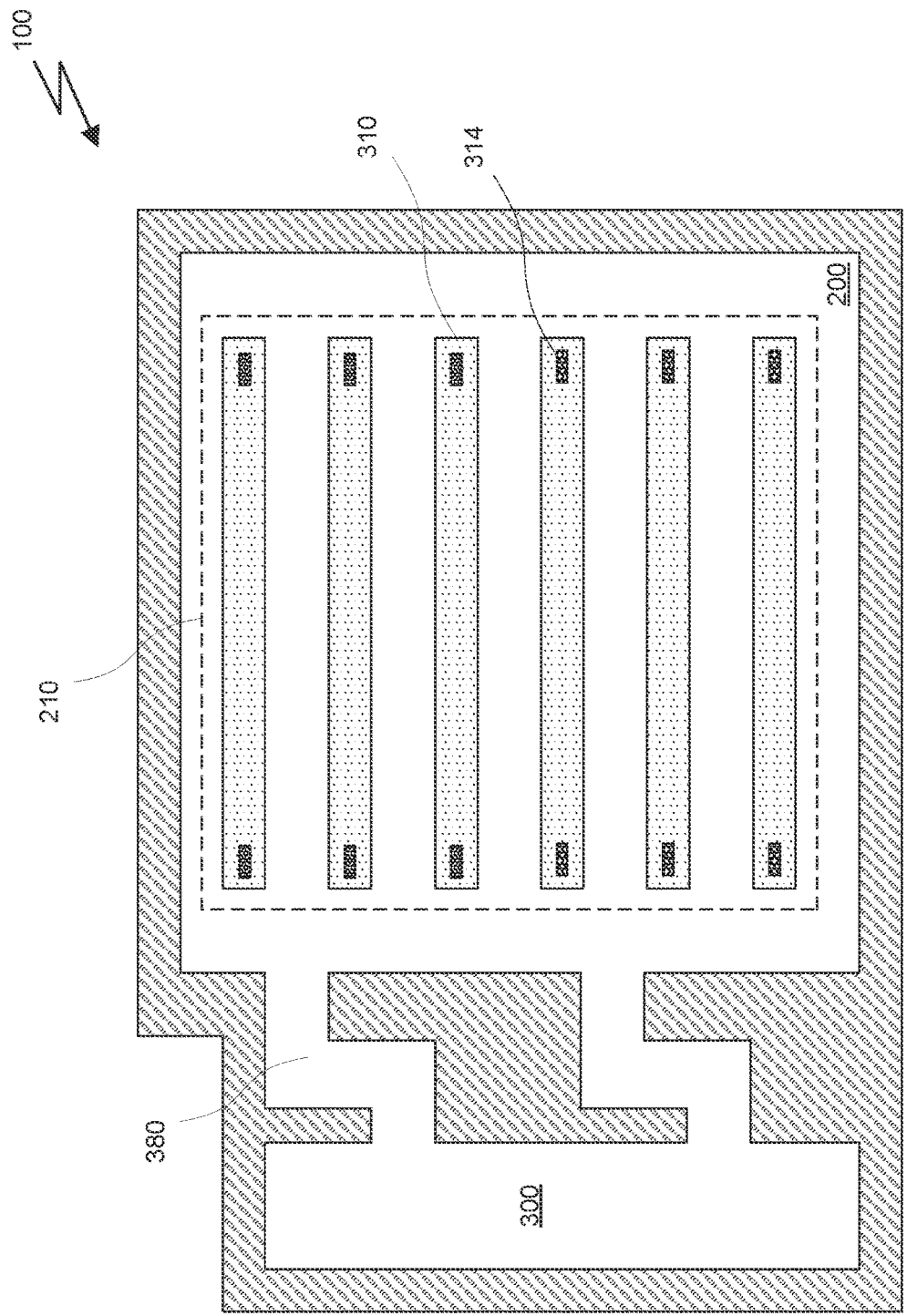
FIG. 3 is a top view of the system showing a layout of the main chamber and ancillary chamber, in accordance with one embodiment.

FIG. 3 is a top view of the system 100 showing a layout of the main chamber 200 and ancillary chamber 300, in accordance with one embodiment. As depicted in FIG. 3, the main chamber 200 houses thermal storage medium 210 comprising an array of six blocks 310. In an embodiment, the blocks 310 can be carbon anode bricks. Carbon anodes can be produced from petroleum coke or alternative low- or high-metal cokes. Other suitable materials such as a variety of graphite or carbide materials may additionally or alternatively be used as thermal storage medium 210.

Each pair of adjacent blocks 310 has a space between them that defines a path for traversal of one or more heat engines 312, which are stored in the ancillary chamber 300 when not in use. The dimensions of the thermal storage medium 210 can vary based on the desired performance. Each block 310 is generally made in the shape of a rectangular prism with two opposing faces (e.g., faces defined with edges along the width and height of the blocks) having a larger exposed surface area compared to the surface area of the faces defined with an edge along a thickness of the blocks 310. The exposed surface of the block 310 is preferably the surface or face along which thermal energy is transformed into electricity by the heat engine 312. However, in other embodiments, the shape/form of the blocks 310 can be modified based on other design goals, such as forming the blocks 310 into an array of concentric rings or having an array of circular or other cross-sectional columns. The thickness of the blocks 310 can be defined based on energy storage needs and discharge performance targets. For example, increasing the thickness of the block 310 increases the volume of material in the block 310, which increases the heat capacity of the block 310, while discharge rate can be limited by the thermal gradient across the thickness of the block 310 and the thermal conductivity of the material.

In an embodiment, the blocks 310 can be formed as solid prisms. However, in other embodiments, the blocks 310 can be formed as a modular collection of smaller components such as stacked bricks or even a collection of unstructured pieces (e.g., gravel). In an embodiment, an exposed face of the block 310 is structured (i.e., non-planar). In other words, the surface of the block 310 has a macro structure that functions to increase the exposed surface area to increase the thermal emission from the surface of the block 310. For example, the macro structure can include square, triangular, or smooth wave surface patterns as well as other patterns. In addition to the macro structure, the surface can also include micro-textures. In yet another embodiment, the thermal storage medium 210 can include a molten material contained in a containment structure (e.g., ceramic) that allows heat in the molten material to radiate from the exposed face of the containment structure.

In an embodiment, each block 310 has a uniform size and structure. In other embodiments, different blocks 310 in the array can have different sizes or structures (e.g., a variety of thicknesses or dimensions such as length and height) to facilitate a more dynamic range of energy storage and discharge capacities. For example, thinner blocks 310 may be better able to handle high discharge rates with lower total energy storage capacity compared to thicker blocks 310. Depending on the dynamic requirements of energy discharge at any given moment, the control system 410 can determine which block 310 is the optimal block 310 for discharge and move a heat engine proximate the selected block to discharge energy from that particular block 310.

In order to move the heat engines 312 from the ancillary chamber 300 to the main chamber 200, a passageway 380 is designed in the wall between the chambers. In one embodiment, the passageway has a zig-zagged shape to deflect heat from the main chamber 200. By blocking the line of sight between the main chamber 200 and the ancillary chamber 300, heat transfer via radiation can be reduced as photons are reflected or re-emitted back into the main chamber 200 and not absorbed by the heat engines 312, walls, or other structures in the ancillary chamber 300, at least for a significant portion of the photons that reach the defined opening in the wall of the main chamber 300. Compared to a straight opening that provides direct line of sight from the main chamber 200 into the ancillary chamber 300, the amount of heat transfer into the ancillary chamber 200 can be significantly reduced.

In some embodiments, the electrodes 314 (e.g., graphite electrodes) are attached to the blocks 310. A current can be passed through the blocks 310 by applying an electrical potential (e.g., voltage) across the pairs of electrodes 314. It will be appreciated that, although only two electrodes are shown per block 310, additional electrodes can be added to the block 310 such as by adding a set of alternating polarity (i.e., anode and cathode) electrodes 314 along the length of the blocks 310. Of course, it will be appreciated that direct resistive heating is only one possible embodiment for charging the thermal storage medium 210, and other embodiments of the system 100 may omit the electrodes 314 in place of other types of heating elements.

Figure 4:
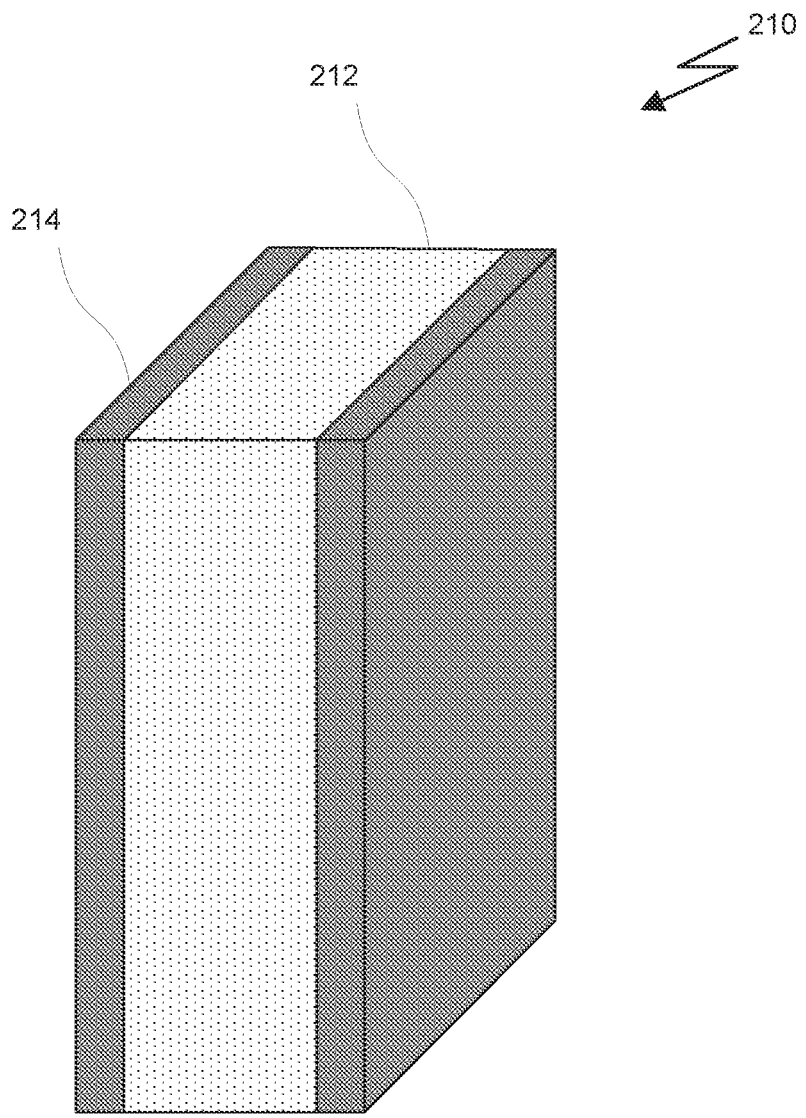
FIG. 4 is a cross-sectional view of a variation of a thermal storage block, in accordance with an embodiment.

FIG. 4 is a cross-sectional view of a variation of a block of the thermal storage medium, in accordance with an embodiment. The thermal storage medium 210 can include an array of blocks, with each block comprising an inner thermal storage core 212 and at least one outer thermal storage layer 214. The thermal storage core and one or more outer layers cooperatively mitigate mechanical stress and cracking that arise from a thermal gradient between the exposed surface of the block and the inner portions of the block. As the blocks can be discharged from more than one surface substantially simultaneously, the stress mitigation via a layered structure can be performed on more than one side of the block, as shown in FIG. 4 where outer thermal storage layers 214 are on two opposite sides of the thermal storage core 212.

In one embodiment, the outer thermal storage layer 214 can be made of a different material that is more resilient to variations in temperature. The outer thermal storage layer 214 can also be fixed in contact with the inner thermal storage core 212. Alternatively, in other embodiments, the outer thermal storage layer 214 can be separated by an air gap or some other transition layer, which functions to buffer and mitigate the mechanical stress due to thermal cooling caused during discharge of that region of the thermal storage medium 210. In another embodiment, the structure of the thermal storage medium 210 can vary across the width of the block with different material compositions or formations for managing mechanical stress and/or thermal capacity.

Figure 5A:
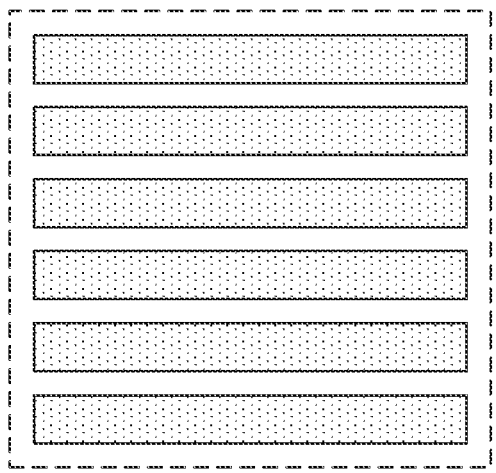
FIGS. 5A-5H are top-down schematic views of various arrangements of blocks within the thermal storage medium of the system, in accordance with some embodiments.
Figure 5B:
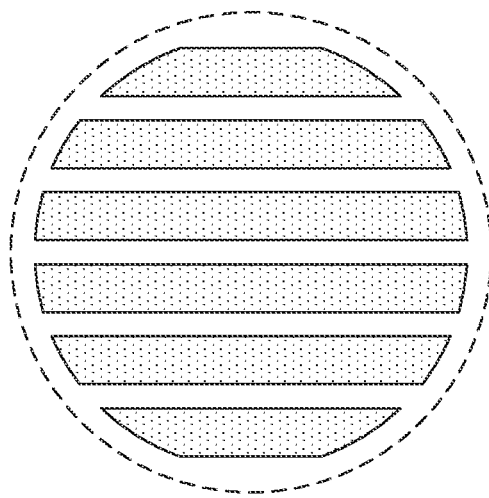

FIGS. 5A-5H are top-down schematic views of various arrangements of blocks within the thermal storage medium of the system, in accordance with some embodiments. In general, the blocks of the thermal storage medium are arranged in a pattern. In one embodiment, as depicted in FIG. 5A, the blocks are of equal size and arranged in a one-dimensional array in a defined rectangular area. In another embodiment, as depicted in FIG. 5B, the blocks are of different size and arranged in a one-dimensional array in a defined circular area, which reduces the surface area of the insulated container surrounding the thermal storage medium 210 compared with the rectangular arrangement of FIG. 5A.

Figure 5C:
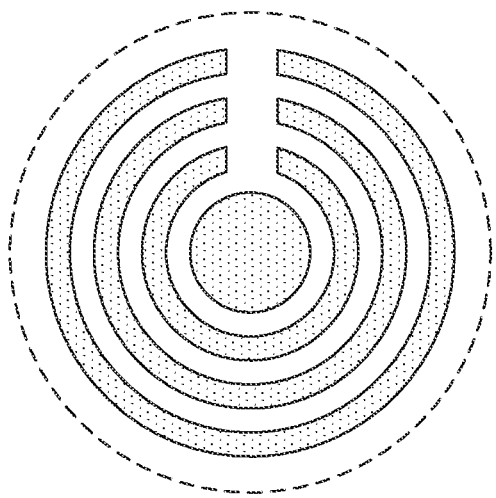
Figure 5D:
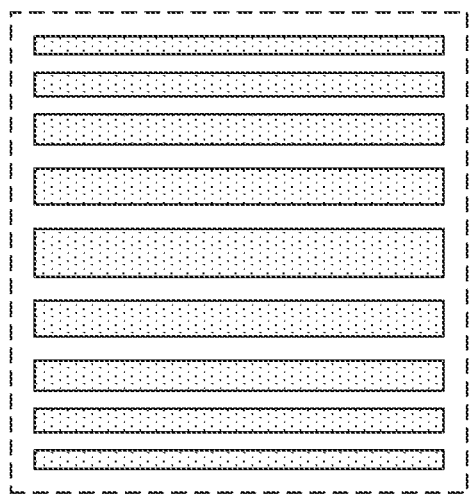

In another embodiment, as depicted in FIG. 5C, the blocks can be arranged in a concentric pattern, which can have advantages by in reducing the complexity of the actuation system 450. For example, the blocks can be arranged as a number of concentric rings surrounding a central circular column. As depicted in FIG. 5D, the type or configuration of blocks can vary, such as varying the thickness of the blocks in accordance with position in the array.

Figure 5E:
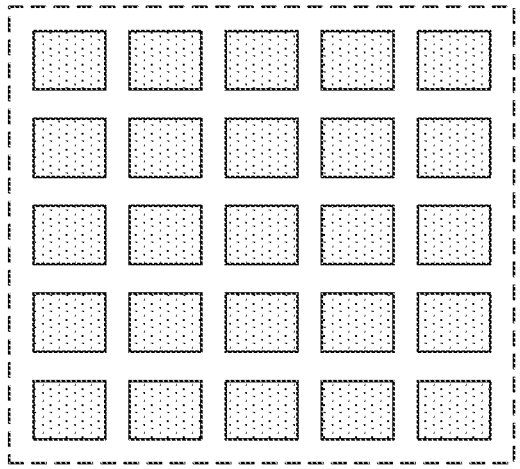
Figure 5F:
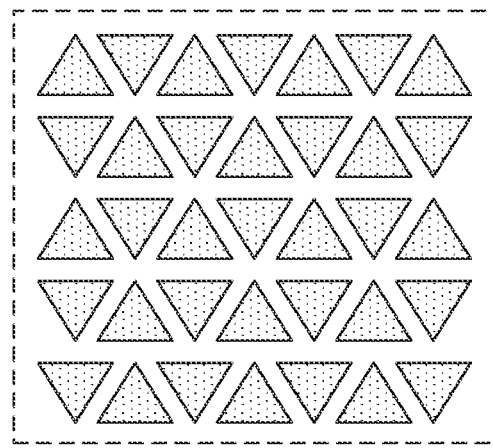
Figure 5G:
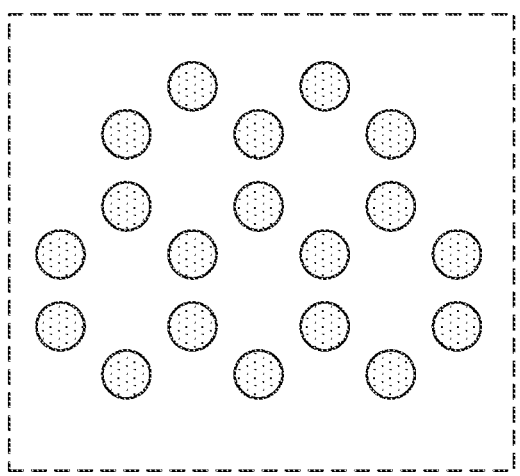
Figure 5H:
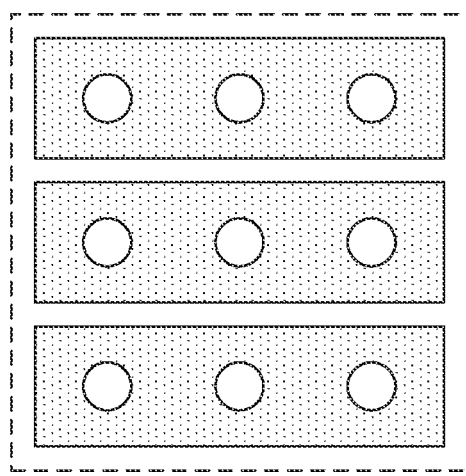

In addition, the thermal storage blocks are not limited to a rectangular prism form, as the blocks may have a square cross-sectional area, as depicted in FIG. 5E, or a triangular cross-section area, as depicted in FIG. 5F, or a circular cross-section area, as depicted in FIG. 5G. Other shapes of the blocks, and spacing between the blocks, are contemplated as being within the scope of the present disclosure. In an embodiment, the array of blocks are arranged in a regular or irregular pattern of columns of the variety of cross-sectional areas discussed above. In other embodiments, the blocks can include holes, as depicted in FIG. 5H, where the heat engines 312 can be inserted into the holes in the interior of the block rather than moved proximate an outer surface of the block.

It will be appreciated that the blocks shown in FIGS. 5A-5H are shown as spaced horizontally in the main chamber 200, the blocks can also be spaced vertically in the chamber, allowing space above or below the blocks to move a heat engine. For example, one or more blocks can be suspended vertically from a ceiling of the chamber. In some embodiments, blocks can be spaced both vertically and horizontally in a three-dimensional array.

In an embodiment, the thermal storage medium 210 is coupled to an energy source such that each of the blocks can be charged (i.e., heated). Preferably, the thermal storage medium 210 is heated through an electrical energy source, which can include the electrical grid as well as energy sources such as, e.g., solar, wind, geothermal, nuclear, combustion, or other suitable energy sources that, in some embodiments, can be converted into electricity by turbine or generators and then converted back into heat through some type of resistive, radiant, or other type of heat transfer mechanism.

In an embodiment, the blocks are charged through direct resistive heating of the thermal storage medium 210. Grid power or other electricity can be stepped down to lower voltages through transformers and/or otherwise conditioned and fed through the insulating layer 114 and coupled to the thermal storage medium 210. In some embodiments, the connection is made through high quality graphite electrodes or any other suitable type of connection that allows for a current to pass through the block(s).

The actuated heat engine 312 functions to transform the stored thermal energy in the blocks into electricity. The heat engines 312 may be, preferably, photovoltaic or TPV heat engines. The heat engine 312 functions to transform thermal energy into electrical energy and can include, e.g., a TPV heat engine comprised of photovoltaic diode cells. At least one side of the TPV heat engine 312 includes exposed TPV cells that can be positioned proximate a surface of a block of the thermal storage medium 210 in order to produce electricity. In some embodiments, the TPV heat engine 312 is dual sided and includes two (or more) sides that include exposed TPV cells configured to produce electricity from two (or more) blocks adjacent the position of the TPV heat engine 312. In some embodiments, the TPV heat engine 312 includes at least two electrical connections used to output the electricity generated by the TPV cells.

In one embodiment, the TPV heat engine 312 can be made from a variety of photovoltaic (PV) materials such as gallium arsenide (GaAs), indium gallium arsenide (InGaAs), silicon (Si), germanium (Ge), gallium antimonide (GaSb), indium gallium arsenide phosphide (InGaAsP), indium gallium arsenide antimonide (InGaAsSb), or other multi junction cells that can be produced as a combination or alloys thereof with a variety of different bandgaps from 0.5 electron volts (eV) to 1.4 eV, although higher or lower bandgaps are possible as well. In one embodiment, a set of TPV heat engines 312 can be distinctly configured for different performance metrics and may be integrated within the same system, selected dynamically for use by the control system 410 as dictated by desired or current operating conditions. For example, a first type of TPV heat engine 312 may be used in a first temperature range, and a second type of TPV heat engine 312 can be used in a second temperature range. The different TPV heat engines 312 can utilized different PV materials, unit sizes, number of TPV cells, or other variable properties or characteristics.

In an embodiment, each TPV heat engine 312 is integrated with a cooling system 420. In an embodiment, a water or liquid cooling supply line is disposed through or next to a support structure of the actuation system to transport coolant to the TPV heat engine 312 and remove hot coolant from the TPV heat engine 312, through a second return (discharge) line. The supply line and return line can be run through or next to the same support structure or through separate support structures, preferably on opposite sides of the TPV heat engine 312. For example, a coolant may flow from the supply line entering a top of the TPV heat engine 312, and heated fluid may exit through a return line on the bottom of the TPV heat engine 312.

In one embodiment, different paths are defined by the arrangement of blocks in the thermal storage medium, and each path is associated with a different heat engine 312. The actuation system 450 operates to move each heat engine along its associated path, varying the position of the heat engine 312 over time in order to efficiently extract energy from the blocks proximate the path in a manner that keeps the thermal gradient within the block below a threshold value. In another embodiment, a single heat engine 312 may be moved among two or more paths defined by the arrangement of blocks, or multiple heat engines 312 can be moved in the same path.

Again, the actuation system 450 can include a gantry mechanized transport system that is positioned above and/or below the thermal storage medium 210. The actuation system 450 can include one or more actuation mechanisms that move the heat engines along a given path within the main chamber 200. In some embodiments, the actuation system 450 can provide for movement in three or more degrees of freedom in both position and/or orientation of the heat engine 312. For example, the heat engines can be rotated in order to fit through openings of smaller width. In another embodiment, as could be used with the arrangement of blocks in FIG. 511, the actuation mechanism could have a single degree of freedom moving a plurality of heat engines 312 into or out of the holes in the blocks. In another embodiment, a single heat engine 312 could be moved into and out of different holes in the blocks as depicted in FIG. 511.

In yet another embodiment, the heat engines 312 can be controlled along a single dimension of the blocks. For example, the gantry system could be designed to move a heat engine 312 along the length of the blocks, but not vary the position of the heat engine across the height of the blocks or position the heat engine above or below the thickness of the blocks. In yet other embodiments, the gantry system could move the heat engine 312 along both the length and height of a given block. In some embodiments, the actuation system 450 can be designed so that a single actuation drive system (e.g., motors, transmissions, cables, etc.) can drive and move multiple heat engines 312 simultaneously, or in sequence. In other embodiments, each heat engine 312 or different subsets of one or more heat engines 312 can be moved by a separate and distinct drive system.

Figure 7:
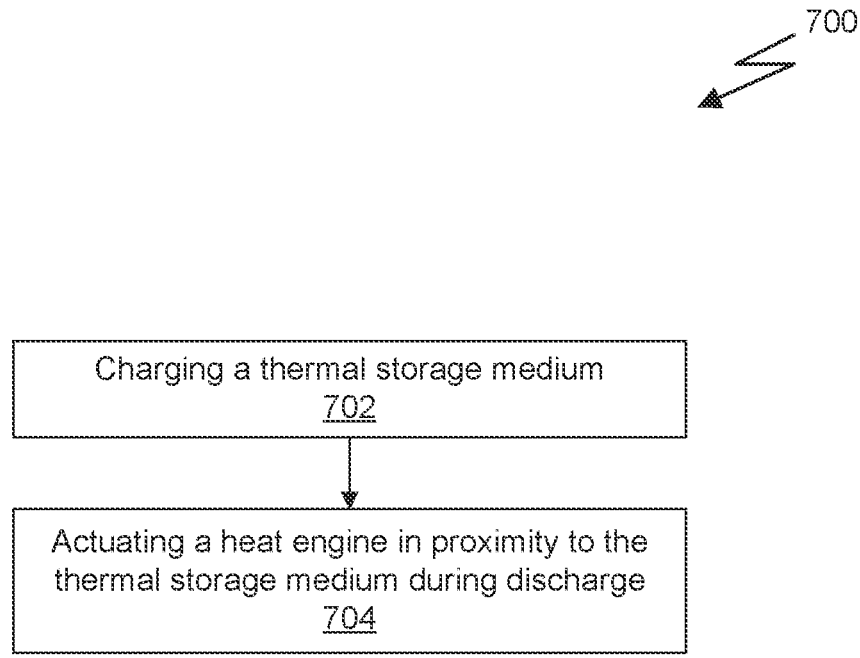
FIG. 7 is a flowchart of a method for discharging the solid-state thermal battery, in accordance with some embodiments.
Figure 8A:
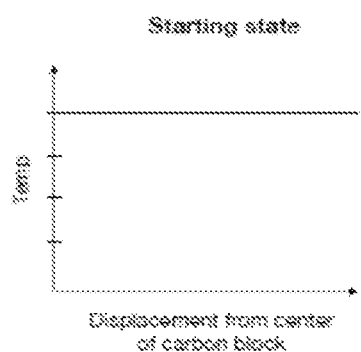
FIGS. 8A-8F illustrate charts that represents the thermal gradient within a thermal storage block during different stages of a discharge cycle, in accordance with some embodiments.
Figure 8B:
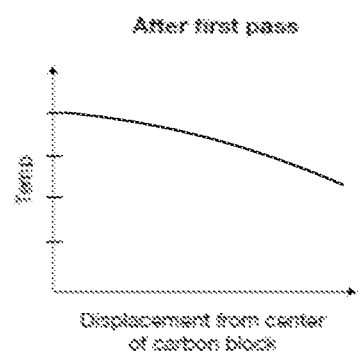
Figure 8C:
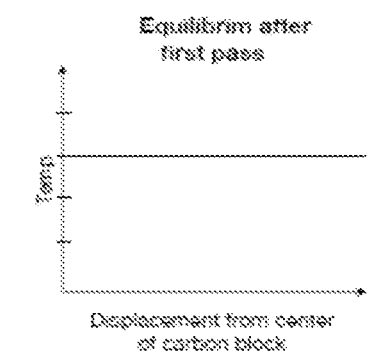
Figure 8D:
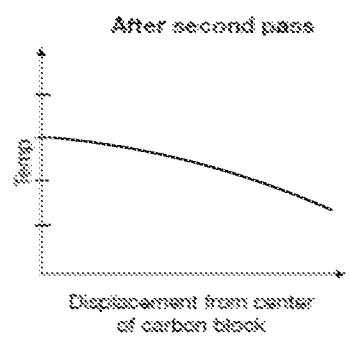
Figure 8E:
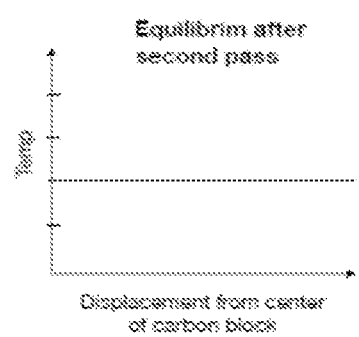
Figure 8F:
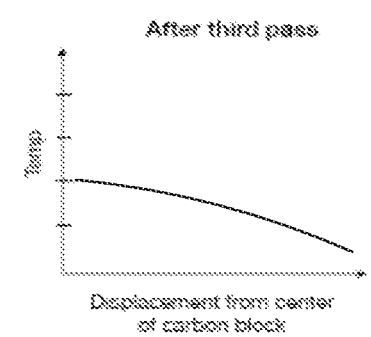

FIG. 7 is a flowchart 700 of a method for discharging the solid-state thermal battery, in accordance with some embodiments. The method describes a technique for charging and discharging the thermal storage medium 210. The method is preferably implemented with a system such as that described in the embodiments set forth above, although the method is not limited to such systems and can be performed with any system capable of charging and discharging a thermal storage medium in the manner set forth below.

At step 702, the thermal storage medium 210 is charged. In some embodiments, electrical energy is converted to thermal energy that is used to heat the thermal storage medium. In an embodiment, electricity is stepped down and/or otherwise conditioned and connected to leads connected to one or more blocks of the thermal storage medium 210, which heat up due to resistive heating. In other embodiments, the electricity is coupled to a laser or array of lasers that generate radiation directed at the surface of the blocks, which absorb some of the energy from the laser beam to heat the thermal storage medium 210. It will be appreciated that any other technique for heating the blocks is within the scope of the present disclosure.

In one embodiment, direct resistive heating is applied using a direct current (DC) power source. In another embodiment, direct resistive heating is applied using an alternating current (AC) power source, which enables productive utilization of the "skin effect" that increases impedance, increasing voltage and lowering current. Utilization of the skin effect can be useful because the thermal storage medium 210 may have relatively large cross-sectional areas. Application of an AC power source may result in faster charging and distribution of thermal energy throughout the thermal storage medium 210.

In one embodiment, the charging of the thermal storage medium 210 is performed periodically to charge the thermal storage medium 210 to a desired temperature. In another embodiment, the charging of the thermal storage medium 210 can be continuously supplied while in a charge state, and disconnected when switching to a discharge state. The degree of charging (e.g., the temperature of the thermal storage medium 210) can be varied over time.

In another embodiment, charging of the thermal storage medium 210 can be performed in a non-uniform manner, wherein different blocks or portions of blocks are heated to different temperatures (e.g., SoC). This can be utilized to account for expected thermal storage duration, to provide a diversity of conditions for different energy outputs, and/or other design considerations. For example, an inner subset of blocks and an outer subset of blocks may be heated to different temperatures, where the inner subset is heated to a higher temperature range than the outer subset. Similarly, there may be a variety of different block configurations, and the charging of those configurations can be coordinated by the control system 410 to match a desired operating characteristic. Accordingly, the charging of the thermal storage medium 210 can include selecting where, when, and how to charge the blocks.

At step 704, during a discharge state, one or more heat engines 312 are actuated in proximity to a thermal storage medium 210. In an embodiment, each heat engine 312 can be moved from the ancillary chamber 300 into the main chamber 200 and placed proximate one or more blocks of the thermal storage medium 210 so as to convert thermal energy in the blocks into electrical energy. Preferably, actuation of the heat engines 312 is performed to control the thermal state of the thermal storage medium 210. In one embodiment, actuation is controlled so as to keep a thermal gradient existing in any one block below a threshold value in order to reduce or mitigate risks of failure due to mechanical stresses in relation to thermal shock.

In an embodiment, the control system 410 models the internal temperature of the thermal storage medium 210 and adjusts the location of the heat engines 312 to allow time for the thermal gradient to relax in certain portions of the blocks while energy is discharged from other portions of the blocks. The control system 410 can augment the model with feedback from, e.g., one or more temperature sensors that can provide data related to a surface temperature of different locations on the blocks.

In an embodiment, the heat engine 312 is moved across the surface of the block such that the thermal energy along the surface of a region is lowered and, once the heat engine 312 has moved past the region, the thermal energy stored internally flows (e.g., via conduction) to raise the level at the surface until the thermal storage medium 210 reaches equilibrium (or at least a substantially more uniform level based on current dissipation of a different region).

In one embodiment, the heat engine 312 is continuously moved along a path (e.g., at a substantially constant or variable rate of speed) across one or more surfaces of the thermal storage medium 210. The heat engine 312 can be moved over the same path in one or more passes to essentially discharge the thermal storage medium in a uniform manner, but allowing for high discharge rates of specific regions over short periods followed by a long recovery period to allow the thermal gradient local to that region to relax as heat flows within the volume of the thermal storage medium 210. In some embodiments, the rate of movement (e.g., speed) of the heat engine 312 can be varied in accordance with sensed or calculated thermal emissions or energy collection criteria. In other embodiments, the control system 410 can move the heat engine 312 to discrete stationary positions, changing the position of the heat engine periodically during discharge.

It will be appreciated that the movement of one heat engine 312 can be applied to multiple heat engines simultaneously proximate the same or different blocks of the thermal storage medium 210, and along the same or different paths, rate of speed, etc.

In some embodiments, a first portion of the thermal storage medium 210 can be discharged to reach a first state, and then a second portion of the thermal storage medium 210 can be discharged to reach a second state, where the first portion is located proximate a perimeter of the main chamber 200 and the second portion is located proximate an interior of the main chamber 200.

In another embodiment, the discharge state can include the control system 410 providing different sets of heat engine configurations and selectively actuating one of the heat engine configurations in accordance with different operating conditions or output properties/characteristics (e.g., load, current, etc.). In some embodiments, different heat engine configurations provide for selectively actuating different types of heat engines 312 or activating heat engines 312 for different sub-regions of the thermal storage medium 210.

It will be appreciated that the method may include controlling the charging or discharging of the system according to a number of control objectives. Operational configurations can be specified through some input (e.g., user input, sensor input, etc.), which is utilized to augment the control of: heating the thermal storage medium; actuating the heat engines; selecting a subset of heat engines for actuation; selecting the regions of the thermal storage medium for discharge; cooling the heat engines through the cooling system, adjusting atmospheric conditions, and the like. In an embodiment, the method can include measuring energy usage statistics over time and predicting energy needs to coordinate the charging and discharging of the thermal storage medium at opportune times. Alternatively, energy needs can be pre-configured through manual input.

FIGS. 8A-8F illustrate charts that represents the thermal gradient within a thermal storage block during different stages of a discharge cycle, in accordance with some embodiments. Motion of the heat engine 312 over a number of passes, rather than simply placing the heat engine at a single location, can substantially reduce the thermal gradient within the thermal storage medium. The risks associated with high thermal gradients have previously limited the energy discharge rate and/or total storage capacity of solid-state thermal battery systems. By controlling the location of the heat engines, such effects can be significantly reduced, thereby increasing the energy discharge rate and total capacity of the systems such that they can be deployed in settings that were not previously efficient or economical.

Figure 9A:
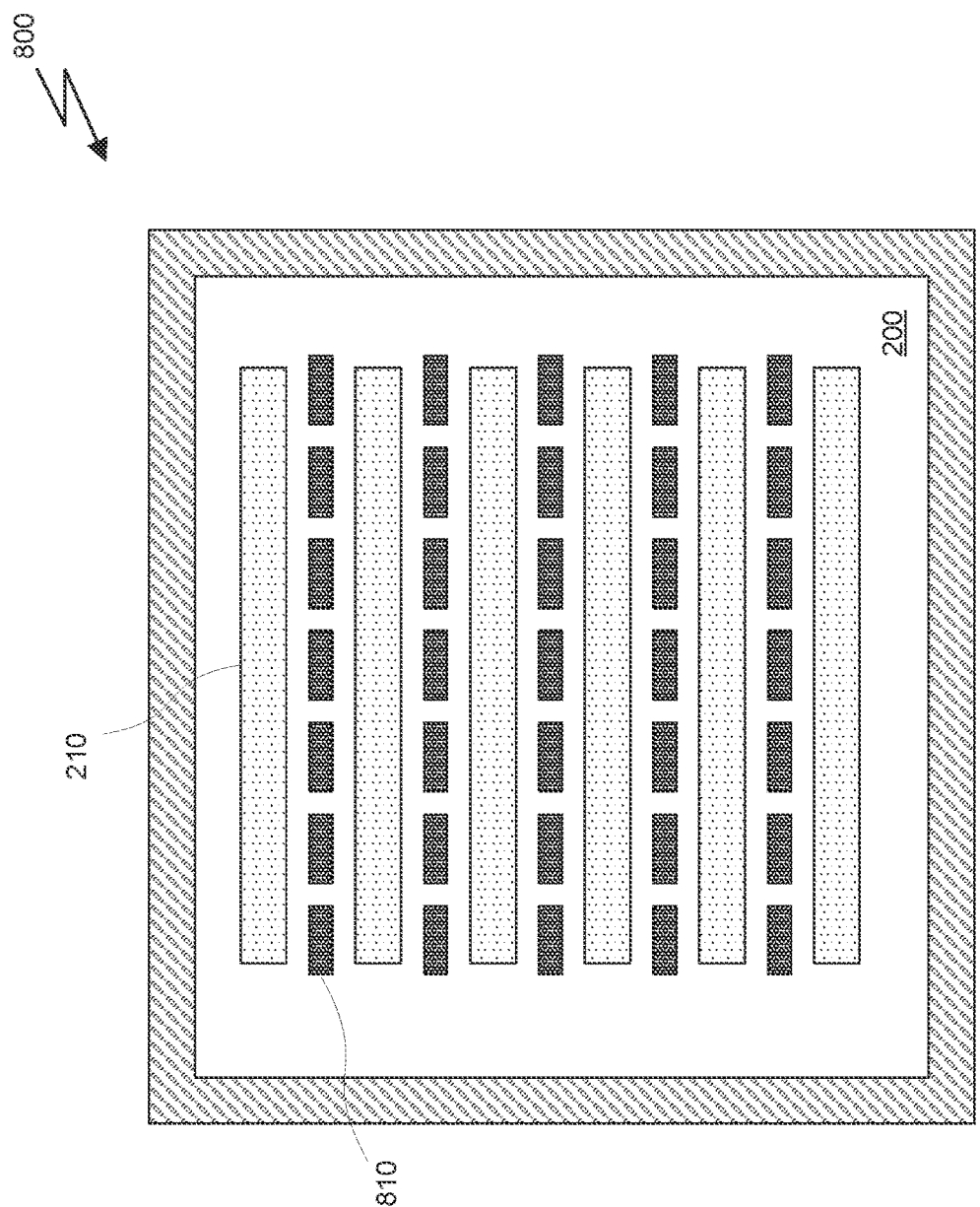
FIGS. 9A & 9B illustrate a system for storing energy in a solid-state thermal battery, in accordance with another embodiment.
Figure 9B:
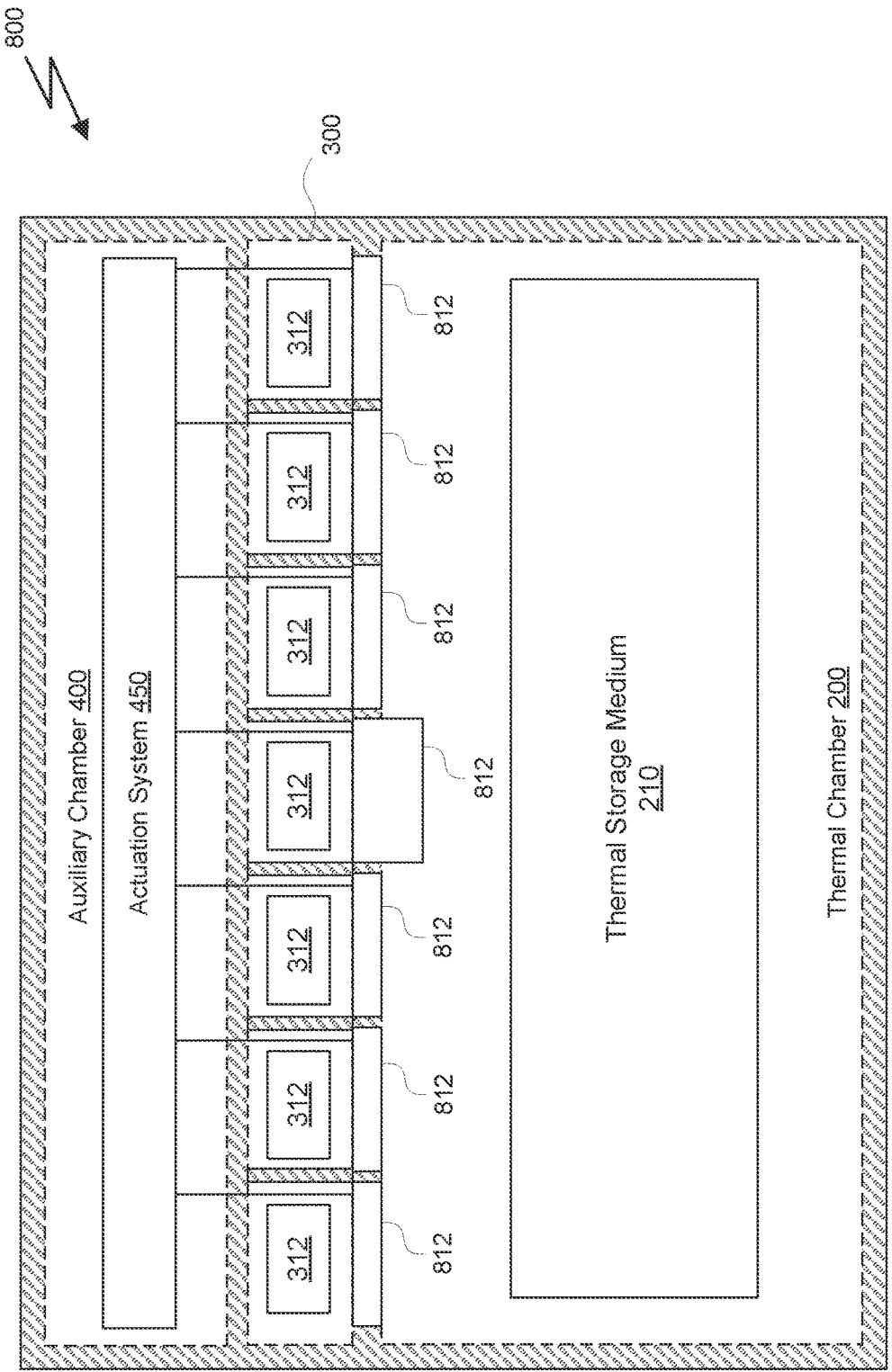

FIGS. 9A & 9B illustrate a system 800 for storing energy in a solid-state thermal battery, in accordance with another embodiment. It will be appreciated that one of the main concerns with operation of the solid-state thermal battery is reducing temperature gradients within the thermal storage medium 210 without limiting the power output of the system to less than a desired operating range. Use of smaller volume (i.e., reducing a thickness) of the blocks in the thermal storage medium can help reduce the thermal gradient within a block, but the reduced volume decreases the energy capacity (i.e., heat capacity) of each individual block and increases the speed of discharge of a block given a constant energy output. It can also be noted that blocks with smaller volumes may also face broader issues related to structural problems (e.g., fractures or other failures can be more prevalent in thinner blocks). The total capacity of the system can be increased by adding more blocks, but this increases the size of the insulated container, and more surface area of the insulated container increases the amount of heat that will escape the system compared to a similar container in a smaller footprint. Therefore, care should be taken to discharge the thermal storage medium 210 in a manner that allows for dense energy storage within the main chamber 200 while maintaining high power output of the system.

One method for accomplishing that goals is set forth above, where heat engines are actuated (e.g., moved) relative to a fixed thermal storage medium 210 within the main chamber 200. However, such embodiments can require complex actuation systems 450 for moving heat engines in and out of the main chamber 200. In another embodiment, as depicted in FIG. 9A, the main chamber 200 can include openings 810 in the ceiling of the chamber that lead to an ancillary chamber 300 above the main chamber 200. Heat engines 312 can be placed in the ancillary chamber 300, with one heat engine corresponding to each opening.

As depicted in FIG. 9B, each heat engine 312 is fixed relative to the thermal storage medium 210, but the heat engine 312 is actuated by opening or closing an insulated door 810 (e.g., hatch, cover, etc.) separating the thermal storage medium 210 from the heat engine 312, which is stored in an ancillary chamber 300 above the main chamber 200, to allow the heat emitted from the thermal storage medium 210 to reach the heat engine 312.

In some embodiments, as shown in FIG. 9B, the actuation system 450, stored in an auxiliary chamber 400 located above the ancillary chamber 300, is configured to open or close insulated doors 812 disposed in the openings 810 in order to activate (i.e., door open) or deactivate (i.e., door closed) each corresponding heat engine 312 located behind the door 812. Furthermore, each heat engine 312 within the ancillary chamber 300 can be isolated from other heat engines 312 in the ancillary chamber 300 by insulated walls that reduce heat transmission from the open door 810 associated with one heat engine 312 to other heat engines 312 within the ancillary chamber 300. As shown in FIG. 9B, a fourth door 812 is in an open configuration while the other doors 812 are in a closed configuration.

In one embodiment, the heat engine 312 is fixed in the same position within the ancillary chamber 300 in both the open and closed configuration of the door 812. For example, the heat engines 312 can be attached to a ceiling of the ancillary chamber 300 such that the heat engines 312 do not move with the mechanism of the door 812. In another embodiment, the heat engines 312 can be attached to the structure of the door 812 such that activating the door 812 from a closed configuration to an open configuration moves the heat engine 312 from the ancillary chamber 300 into, at least partially, the main chamber 200. However, once the door 812 is in an open configuration, the heat engine 312 remains fixed in that position relative to the thermal storage medium 210.

The system 800 includes a plurality of heat engines 312 located at different positions relative to the thermal storage medium 210. The control system 410 (not explicitly shown in FIG. 9B) is then configured to select particular doors 812 to open to discharge the thermal storage medium at any number of discrete locations defined by the locations of the openings 810 in the ceiling of the main chamber 200. By sequentially opening different doors 812, the control system 410 can effectively limit the size of the thermal gradient within the thermal storage medium 210 at any particular region of the thermal storage medium, thereby mitigating risks of thermal stress induced cracking or mechanical failure.

Although not shown explicitly, the system 800 can include many of the same auxiliary systems as the system 100, including the cooling system 420, the atmospheric control system 430, the cleaning system(s) 440, and/or the gas reservoir system 500.

In some embodiments, heat engines 312 can be located behind openings in the floor or walls of the main chamber 200 in addition to or in lieu of the heat engines 312 located behind openings in the ceiling of the main chamber 200. In addition, in some embodiments, the thermal storage medium 210 can comprise a single block (e.g., rectangular prism, column, etc.) as there is no requirement that the heat engines 312 move through or between the blocks forming the thermal storage medium 210. In one embodiment, the main chamber 200 can be substantially filled with loose collection of unstructured pieces of thermal storage material distributed below the openings 810 in the ceiling of the main chamber 200. Elimination of the paths or passageways between the blocks can allow for the total size of the main chamber 200 to be reduced, increasing the energy storage density of the main chamber 200 and reducing the surface area of the insulated container used to house the system 800. However, when increasing the volume of the thermal storage medium 210, care must be taken that there exists a sufficient number of heat engines 312 to efficiently discharge the thermal storage medium 210 without resulting in excessive thermal gradients within the thermal storage medium 210.

It can be appreciated that, in some (but not all) cases depending on design requirements, the number of heat engines 312 required by the system 800 can be significantly more than the number of heat engines 312 required by the system 100, which can increase the overall cost of the solid-state thermal battery. However, savings gained from a reduction in complexity of the actuation system and a reduced size of the overall insulated container may offset some of the increases in cost associated with the additional heat engines 312.

The disclosure above sometimes refers to the material of the thermal storage medium 210 as carbon-based or carbon blocks. While carbon-based or carbide materials are exemplary materials for the thermal storage medium 210, nothing in this disclosure should be construed as limiting the thermal storage medium 210 to such materials, as other types of materials or structures with a variety of heat capacities are contemplated as being within the scope of the present disclosure. The only limits placed on the type of thermal storage medium 210 are considerations based on energy density (i.e., specific heat) of the material, the ability of the material to be heated within a given temperature range, and any considerations for containing or charging/discharging the material within the given temperature range.

To facilitate an understanding of the subject matter described herein, many aspects are described in terms of sequences of actions. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A system for storing energy in a solid-state thermal battery,
comprising:
an insulated container;
a thermal storage medium enclosed within the insulated container; and one or more actuated heat engines proximate the thermal storage medium, wherein the solid-state thermal battery is discharged by actuating, via an actuation system, a plurality of insulated doors disposed in an opening between a main chamber and an ancillary chamber of the insulated container, and wherein a control system is configured to activate different subsets of insulated doors at different times to vary a region of discharge of the thermal storage medium over time.

2. The system of claim 1, wherein the thermal storage medium comprises an array of blocks arranged in a pattern such that one or more passageways are defined in the negative space between the blocks.

3. The system of claim 2, wherein, the solid-state thermal battery is discharged by moving, via an actuation system, at least one of the one or more actuated heat engines through the one or more passageways.

4. The system of claim 3, wherein the one or more actuated heat engines are stored in an ancillary chamber of the insulated container when not actively converting heat stored in the thermal storage medium into electricity.

5. The system of claim 4, wherein the ancillary chamber is located adjacent to and separated from the main chamber by an insulated wall, wherein the thermal storage medium is disposed in the main chamber, and wherein the insulated wall includes one or more openings configured to allow the one or more actuated heat engines to be moved from the ancillary chamber into the main chamber.

6. The system of claim 5, wherein at least one opening in the one or more openings comprises a non-direct passageway that prohibits a direct line of sight from the main chamber into the ancillary chamber.

7. The system of claim 2, wherein the array of blocks comprises a one-dimensional array of rectangular prisms.

8. The system of claim 2, wherein the array of blocks comprises a number of concentric rings surrounding a central circular column.

9. The system of claim 2, wherein the array of blocks comprises a regular or irregular arrangement of columns.

10. The system of claim 1, further comprising:
a control system configured to operate the one or more actuated heat engines to dynamically discharge different regions of the thermal storage medium over a period of time in order to reduce a thermal gradient in each region of the thermal storage medium; and
a cooling system configured to regulate an operating temperature of the one or more actuated heat engines.

11. The system of claim 10, further comprising at least one of:
an atmospheric control system;
a cleaning system; or
a gas reservoir system.

12. The system of claim 10, wherein at least one actuated heat engine in the one or more actuated heat engines comprises one or more thermophotovoltaic (TPV) cells.

13. The system of claim 12, wherein the one or more actuated heat engines include at least two different types of actuated heat engines, and wherein a particular type of actuated heat engine is selected by the control system in accordance with a desired or current operating condition of the system.

14. The system of claim 1, wherein the thermal storage medium is charged by direct resistive heating by applying an electrical current to electrodes attached to the thermal storage medium.

15. The system of claim 14, wherein the electrical current is applied by an alternating current (AC) power source.

16. The system of claim 1, wherein the thermal storage medium is charged by indirect radiant heating.

17. A method of storing energy in a solid-state thermal battery, the method comprising:
charging a thermal storage medium by heating one or more blocks to increase a temperature of the one or more blocks; and
discharging the thermal storage medium to convert heat into electricity by controlling one or more actuated heat engines in proximity to the thermal storage medium, wherein controlling the one or more actuated heat engines in proximity to the thermal storage medium comprises operating a plurality of insulated doors disposed between a main chamber of an insulated container and an ancillary chamber of the insulated container, wherein different subsets of insulated doors are open at different times to reduce a thermal gradient in each of several regions within the thermal storage medium.

18. The method of claim 17, wherein controlling the one or more actuated heat engines in proximity to the thermal storage medium comprises:
moving, via an actuation system, at least one actuated heat engine from an ancillary chamber of an insulated container into the main chamber of the insulated container, wherein the thermal storage medium is contained in the main chamber and defines at least one passageway for the at least one actuated heat engine to move along a path within the main chamber.

19. The method of claim 18, wherein a control system is configured to vary a position of the at least one actuated heat engine along the path over time to reduce a thermal gradient in each of several regions within the thermal storage medium.

20. The method of claim 17, wherein at least one actuated heat engine in the one or more actuated heat engines comprises one or more thermophotovoltaic (TPV) cells.

21. The method of claim 20, wherein the one or more actuated heat engines include at least two different types of actuated heat engines, and wherein a particular type of actuated heat engine is selected by a control system in accordance with a desired or current operating condition.

22. The method of claim 17, wherein charging the thermal storage medium comprises increasing a temperature of the thermal storage medium using direct resistive heating by applying an electrical current to electrodes attached to the thermal storage medium.

23. The method of claim 17, wherein charging the thermal storage medium comprises increasing a temperature of the thermal storage medium via indirect radiant heating.

* * * * *